United States Patent [19]
Terrizzi

[11] Patent Number: 5,452,977
[45] Date of Patent: * Sep. 26, 1995

[54] FASTENER SYSTEM

[76] Inventor: A. Scott Terrizzi, 34 Cambry La., Elkton, Md. 21921

[*] Notice: The portion of the term of this patent subsequent to Apr. 18, 2012 has been disclaimed.

[21] Appl. No.: 253,943

[22] Filed: Jun. 3, 1994

Related U.S. Application Data

[63] Continuation-in-part of Ser. No. 130,769, Oct. 4, 1993.

[51] Int. Cl.⁶ ..................................................... F16B 39/02
[52] U.S. Cl. .............................. 411/82; 411/304; 411/258; 411/930; 405/259.5
[58] Field of Search ............................ 411/82, 304, 258, 411/259, 930, 171, 418, 69; 405/459.6

[56] References Cited

U.S. PATENT DOCUMENTS

| | | | |
|---|---|---|---|
| 2,409,638 | 10/1946 | Lyon | 411/304 |
| 3,061,455 | 10/1962 | Anthony | 411/930 |
| 3,247,752 | 4/1966 | Greenleaf | |
| 3,639,137 | 2/1972 | Marinelli | 411/930 |
| 3,897,713 | 8/1975 | Gugle | 411/82 |
| 4,059,136 | 11/1977 | Wallace | 411/258 |
| 4,712,957 | 12/1987 | Edwards | 411/82 |

FOREIGN PATENT DOCUMENTS

| | | | |
|---|---|---|---|
| 1040083 | 8/1966 | United Kingdom | 411/304 |

*Primary Examiner*—Flemming Saether
*Attorney, Agent, or Firm*—M. K. Silverman

[57] ABSTRACT

A fastening system includes a fastener having a threaded shank and a head, the head having upper and lower surfaces and depending integrally from the lower surface of the head, the lower surface including a channel concentric relative to the shank. The shank of the fastener includes its first channel extending along a length and a second channel also extending along a length of the shank. Within the first shank channel is provided a bonding base material, and within the second shank channel is provided a bonding activator material. Rotation of the fastener within a medium to be fastened will cause an extrusion of the bonding base and activator materials into the annular channel in which a curing reaction therebetween will occur, effectively bonding the lower surface of the fastener head to an exterior surface of the medium to be fastened.

12 Claims, 2 Drawing Sheets

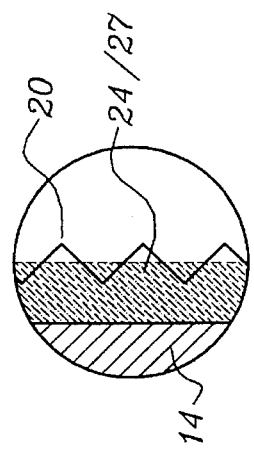
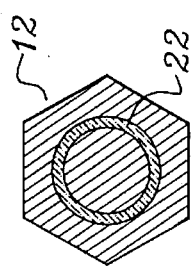
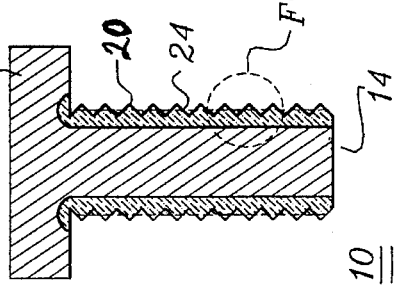
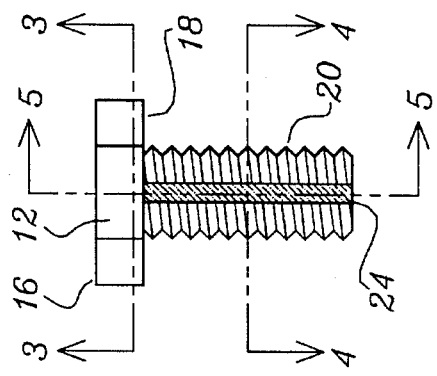
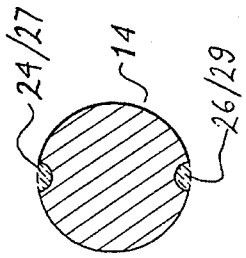
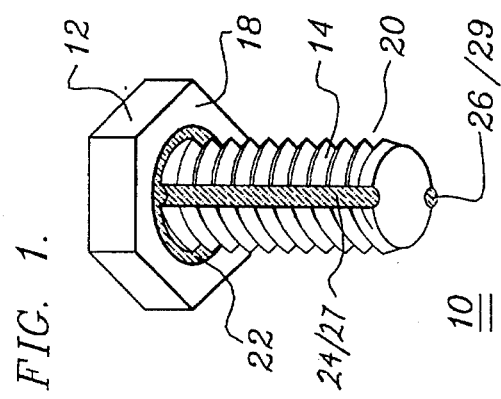

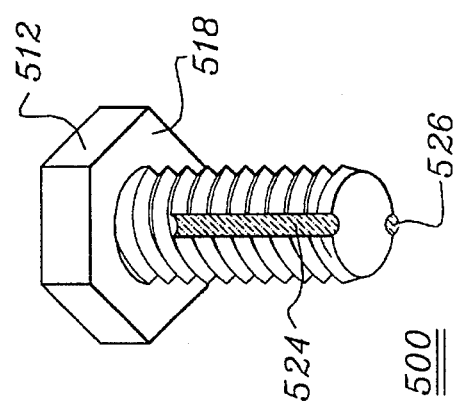
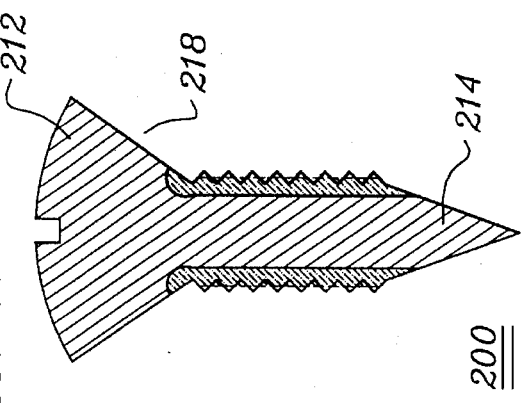
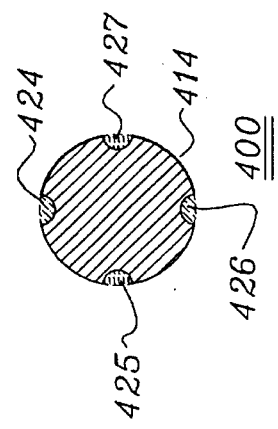
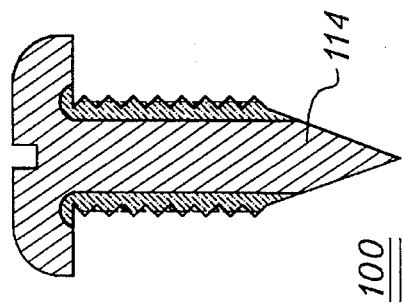
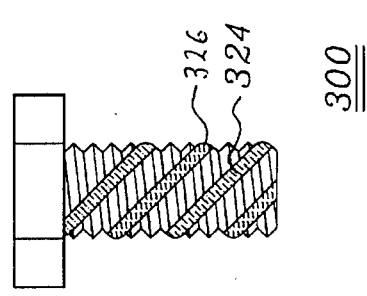

FASTENER SYSTEM

REFERENCE TO RELATED APPLICATION

This case is a continuation-in-part of application Ser. No. 08/130,769, filed Oct. 4, 1993, entitled Fastener System.

BACKGROUND OF THE INVENTION

1. Area of the Invention

The present invention relates to fastening means and, particularly, fasteners used in combination with a bonding material.

2. Prior Art

The prior art in the instant area comprises fasteners such as bolts, screws, and other hardware provided with a threaded shank and a head adapted for use in combination with a washer. More particularly, in the prior art, efforts to optimize the relationship of a fastener relative to a medium to be fastened have consisted of such approaches as providing an O-ring within the lower surface of the head of the fastener or the provision of a longitudinal nylon strip along the shank of the fastener, this constituting the well-known NYLOCK nut. An example of the latter approach appears in U.S. Pat. No. 2,409,638 (1946) to Lyon. Examples of the O-ring type of prior art exist in U.S. Pat. No. 2,752,814 (1956) to Iaia; No. 3,247,752 (1966) to Greenleaf, and No. 3,897,713 (1975) to Gugle. In other words, it is known in the art to provide an O-ring or elastomeric washer within an annular recess within the lower surface of the head of the fastener. It is likewise known in the art to provide a strip of nylon or polymeric material along the longitudinal length of the shank of the fastener to enhance the locking properties between the fastener and a bolt threaded thereunto or between the fastener and the medium to be fastened.

There does not, however, to the knowledge of the inventor exist any prior art which provides for or enables the reaction of a two-phase chemical bonding system as a result of simple rotation of the fastener within the medium to be fastened in which through the facilitation of such reaction, securement of the lower surface of the head of the fastener to an external surface of the medium to be fastened is accomplished.

SUMMARY OF THE INVENTION

The instant invention relates to a system comprising a fastener having a threaded shank and a head, said head having upper and lower surfaces thereof, said shank depending integrally from said lower surface of said head, said lower surface of said head including a channel concentric relative to said shank. The shank of said fastener includes a first channel extending along a length thereof and a second channel also extending along a length of said shank. Within said first shank channel is provided a bonding base material, and within said second shank channel is provided a bonding activator material. Rotation of said fastener within a medium to be fastened thereto will cause an extrusion of said bonding base and activator materials into said annular channel wherein a curing reaction therebetween will occur, thereby effectively bonding said lower surface of said fastener head to an exterior surface of the medium to be fastened, It is accordingly an object of the present invention to provide a fastening system in which a bolt, screw or related fastener is provided, at the time of production thereof, as discreet parts thereof, a bonding base and bonding activator which material will co-act with each other only upon usage of the fastener within a medium to be fastened.

It is another object of the invention to provide a substitute means for a washer which, over an extended period of time, will provide the function of a classical washer as well as desired bonding and resilience functions.

The above and yet other objects and advantages of the present invention will become apparent from the hereinafter set forth Brief Description of the Drawings, Detailed Description of the Invention and Claims appended herewith.

BRIEF DESCRIPTION OF THE DRAWINGS

FIG. 1 is a perspective elevational view of a first embodiment of the invention.

FIG. 2 is a front plan view of the fastening system of FIG. 1.

FIG. 3 is a radial cross-sectional view of FIG. 2 taken along Line 3—3 thereof.

FIG. 4 is a radial cross-sectional view taken along Line 3—3 thereof.

FIG. 4 is a radial cross-sectional view of FIG. 2 taken along Line 4—4 of FIG. 2.

FIG. 5 is a longitudinal cross-sectional view taken along Line 4—4 thereof.

FIG. 5A is an enlarged view taken within the circular area labelled "5A" of FIG. 5.

FIGS. 6 and 7 are longitudinal views, in the nature of FIG. 5, however with reference to other fastener configurations to which the instant invention is applicable.

FIG. 8 is a perspective view of a further embodiment of the instant invention showing the presence of two channels disposed spirally within the shank of the channel.

FIG. 9 is a radial cross-sectional view showing an embodiment of the invention using shank channels that are polarly displaced from each other.

FIG. 10 is a perspective view of a further embodiment of the invention which does not include a concentric channel within the head of the fastener and which does not require that the channels within the shank of the fastener extend entirely to the head of the fastener.

DETAILED DESCRIPTION OF THE INVENTION

With reference to FIGS. 1 to 5 there is shown a fastener in the nature of a bolt 10 which includes a head 12 and a shank 14. As may be noted said head includes an upper surface 16 and a lower surface 18, while said shank 14 exhibits a plurality of pitched threads 20.

Also included within the embodiment of FIGS. 1 to 5 is a concentric channel 22 located within said lower surface 18 of said head 12.

Further provided is a first shank channel 24 and a second shank channel 26 (see FIGS. 1 and 4), each of which channels may, optionally, communicate with said annular head channel 22.

Within said first shank channel is provided a bonding base material 27 of a two-phase bonding system such as an epoxy or silicone. However, in the absence of an activating agent the material 27 within channel 24 will remain inert indefinitely.

Within said second shank channel 26 is disposed a bonding activator material 29. Such an activator material will remain inert indefinitely unless it comes into contact with said base material 27.

As may be noted in the enlarged view of FIG. 5A, the depth of channel 24 is greater than the least diameter of the pitched threads 20 but less than the maximum diameter thereof. Accordingly, the material 27 within channel 24 will not interfere with the threading function of the fastener 10.

Upon rotation of the fastener 10 into a medium to be fastened an upward extrusion of the base and activator materials 27 and 29 within said channels 24 and 26 into said annular channel 22. Therein a mixing of the base and activator materials will occur, giving rise to a curing reaction therebetween. Also, some curing may occur between said base and bonding materials within any clearance that may exist between the shank 14 and the medium into which the shank is inserted. Accordingly, a chemical bonding between the fastener and the medium of interest will occur that is supplemental to the normal mechanical securement between the fastener and the medium of interest. As may be appreciated, there will exist many applications in which a sheet-like or laminated material will be provided between the head of the fastener and medium of interest. In such applications, the value of a chemical bond of the above described, whether above or below such a sheet-like material is apparent.

With reference to FIG. 6, the application of the instant invention to a pan head screw 100 is shown. The only difference between this embodiment and that of the embodiments of FIGS. 1 thru 5, lies in the shape of shank 114 thereof.

With reference to FIG. 7, there is shown the application of the invention to a counter-mount head screw 200. Said screw 200 differs from the geometry of said pan head screw in the configuration of head 212 thereof. Clearly, in this embodiment, the lower base 218 of head 212 will be at an obtuse angle relative to the longitudinal axis of shank 214, as opposed to the right angle of the lower head surfaces relative to the shanks in the embodiments of FIGS. 1 thru 6.

It is to be appreciated that the principles of the invention are also applicable to a wide variety of other types of fasteners, these including without limitation glove button snaps, lift-o-dot stud of the machine and sheet metal types, turn-buckle screws and tex screws.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

Shown in FIG. 8 is a further embodiment of the instant invention in the form of fastener 300 which is characterized by the use of two spirally disposed shank channels 324 and 326 respectively. As may be appreciated, said channels, and the materials therein, function in a manner analogous to said channels 24 and 26 of the first embodiment.

Shown in FIG. 9 is further embodiment of the invention in the form of fastener 400 in which there are provided polarly disposed channels 424, 425, 426 and 427. This embodiment differs from that of the embodiment of FIGS. 1 thru 5A in the use of four longitudinal channels in which, in alternating channels, there is disposed base and activator material. Thereby, channels 424 and 426 would contain base material while channels 425 and 427 would contain activator material.

Shown in FIG. 10 is an embodiment 500 of the invention, otherwise similar to the embodiment of FIGS. 1 thru 5A, however, indicating therein that the instant invention may be practiced in the absence of concentric channel 22 and, in yet another instance, in the absence of the extension of channels 524 and 526 entirely up to the lower surface 518 of head 512 of the fastener.

Having thus described my invention what I claim as new, useful and non-obvious and, accordingly, secure by Letters Patent of the United States is:

1. A system comprising:
    (a) a fastener having (i) a threaded shank and a head, said head having upper and lower surfaces thereof, said shank depending integrally from said lower surface of said head, said lower surface of said head including a channel concentric relative to said shank, (ii) a first channel extending along a length of said shank, and (iii) a second channel also extending along a length of said shank;
    (b) a function-facilitating base material disposed within said first shank channel; and
    (c) a function-facilitating bonding activator material disposed within said second shank channel,
    wherein rotation of said fastener within a medium into which said fastener is inserted will cause an upward extrusion of said bonding base and activator material into said annular channel, wherein a desired curing reaction between said materials will occur thereby effecting a chemical bond between said lower surface of said fastener head and an exterior surface of the medium into which said fastener has been inserted.

2. The system as recited in claim 1, in which said fastener comprises a bolt.

3. The system as recited in claim 1, in which said fastener comprises a screw.

4. The system as recited in claim 1, in which each of said shank channels is in communication with said concentric head channel.

5. The system as recited in claim 4, in which said shank channels are disposed spirally upon said shank.

6. The system as recited in claim 4, in which said shank channels are polarly displaced from each other.

7. A system comprising:
    (a) a fastener having (i) a threaded shank and a head, said shank depending integrally from said lower surface of said head, (ii) a first channel extending along a length of said shank, and (iii) a second channel also extending along a length of said shank;
    (b) a function-facilitating base material disposed within said first shank channel; and
    (c) a function-facilitating bonding activator material disposed within said second shank channel,
    (d) said channels have a depth which extends to between a least diameter of said threads and a maximum diameter of the threads,
    whereby rotation of said fastener within a medium into which said fastener is inserted will cause an upward extrusion of said bonding base and activator material wherein a desired curing reaction between said materials will occur.

8. The system as recited in claim 7, in which said fastener comprises a bolt.

9. The system as recited in claim 7, in which said fastener comprises a screw.

10. The system as recited as in claim 7, in which each of said shank channels is concentric head channel within said lower surface of said head of fastener.

11. The system as recited in claim 7, in which said shank channels are disposed spirally upon said shank, 12. The system as recited in claim 7, in which said shank channels are polarly displaced from each other.

* * * * *